United States Patent [19]

Lax

[11] Patent Number: 4,580,101

[45] Date of Patent: Apr. 1, 1986

[54] FM DEMODULATORS WITH LOCAL OSCILLATOR FREQUENCY CONTROL CIRCUITS

[75] Inventor: Alexander P. Lax, London, England

[73] Assignee: Multitone Electronics PLC, London, England

[21] Appl. No.: 596,519

[22] Filed: Apr. 4, 1984

[30] Foreign Application Priority Data

Apr. 6, 1983 [GB] United Kingdom ............... 8309328

[51] Int. Cl.[4] ............................................. H03D 3/02
[52] U.S. Cl. ..................................... 329/50; 329/124; 375/81; 375/120; 455/214; 455/260
[58] Field of Search .................... 329/50, 122, 124; 375/81, 82, 94, 120, 97; 455/214, 260, 265, 337, 164, 165

[56] References Cited

U.S. PATENT DOCUMENTS

| 3,600,700 | 8/1971 | Matsuo | 329/122 X |
| 4,344,178 | 8/1982 | Waters | 375/81 |
| 4,367,558 | 1/1983 | Gercekci et al. | 455/260 X |

FOREIGN PATENT DOCUMENTS

| 0071514 | 2/1983 | European Pat. Off. |
| 1530602 | 11/1978 | United Kingdom |
| 1534465 | 12/1978 | United Kingdom |
| 2086158 | 5/1982 | United Kingdom |
| 2109201 | 5/1983 | United Kingdom |
| 2122437 | 1/1984 | United Kingdom |
| 2124840 | 2/1984 | United Kingdom |

Primary Examiner—Siegfried H. Grimm
Attorney, Agent, or Firm—Renner, Otto, Boisselle & Lyon

[57] ABSTRACT

An FM demodulator includes frequency conversion means (20) to derive from an FM input signal (10) a pair of like signals that are mutually phase-displaced by 90°. Such signals are filtered (26,28), squared (30,32) and sampled (38). The output signal (40) of the sampling means (38) is used to control (62) the local oscillator (16) of the frequency conversion means (20). In one arrangement, the magnitude of the control applied to the oscillator (16) is dependent on the frequency of one of the squared (30) signals, whereas the direction is dependent on the logic state of the output signal (40). A similar control method can be applied to a superheterodyne receiver.

8 Claims, 15 Drawing Figures

FM DEMODULATORS WITH LOCAL OSCILLATOR FREQUENCY CONTROL CIRCUITS

BACKGROUND OF THE INVENTION

1. Field of the Invention

This invention relates to FM demodulators, i.e. demodulators or discriminators for demodulating frequency-modulated (FM) signals.

2. Description of the Prior Art

A known type of demodulator or discriminator for an FSK (frequency shift keyed) FM signal, described in UK Patent Specification No. GB 1 517 121, comprises two mixers each connected to receive an FSK input signal, a local oscillator operative to apply an output at the input signal frequency directly to one mixer, a 90° phase shifter operative to apply the local oscillator output to the other mixer with a phase shift of 90°, a respective low pass filter connected to filter the output from each of the mixers, a respective limiting amplifier operative to produce a square wave from the output of each filter, and a circuit for sampling one square wave every time the other square wave change amplitude in one sense—i.e. the one square wave is sampled once per period thereof—to reproduce the modulation of the input signal.

The performance of this type of discriminator or demodulator is optimised when the local oscillator frequency is half-way between the two extreme frequencies of the transmitted FM signal. In the case of an FSK signal, these extreme frequencies will be the actual two frequencies being alternately transmitted. It will therefore be apparent that, in the types of demodulator described in UK Patent Specification No. GB 1 517 121, great care must be taken in the design of the local oscillator to ensure an accurate and stable oscillating frequency. This is difficult to achieve in practice, particularly if the circuit is to be used over a wide range of temperatures.

Similar considerations apply to other receiver systems, for example those based on the superheterodyne principle, the local oscillator frequency then being required to be maintained at the centre transmission frequency.

SUMMARY OF THE INVENTION

It is an object of the present invention to provide an FM demodulator in which the centre or average frequency of a signal derived from the received signal can be controlled by control of a local oscillator frequency in response to at least one output parameter.

According to one aspect of the present invention there is provided an FM demodulator comprising:

frequency conversion means, including local oscillator means, operative to derive from an FM input signal a plurality of like signals of mutually different phase;

filter means operative to filter each of said plurality of like signals to produce a corresponding plurality of filtered signals;

squaring means operative on each of the plurality of filtered signals to produce a corresponding plurality of substantially square-wave signals; and sampling means operative to sample periodically a said square-wave signal at instants determined by amplitude transitions of at least one other of said square-wave signals thereby to provide an output signal; and frequency control means responsive to the output signal of the sampling means to control the frequency of the local oscillator means.

In one embodiment, used when the transmitted modulation is balanced, the output signal of the sampling means is simply filtered by a suitable low-pass filter and the resultant voltage is used to control the frequency of the local oscillator means.

In another embodiment, used when the transmitted modulation is not balanced, the frequency control means controls the local oscillator frequency in accordance with the frequency of one of the square-wave signals from the squaring means, whether the oscillator frequency is incresed or decreased by an appropriate amount depending on the binary state of the output signal, this being determined by a suitable threshold measurement of the output signal.

According to another aspect of the present invention, there is provided an FM demodulator comprising:

frequency conversion means, including local oscillator means, operative to derive from an FM input signal a like signal at a difference frequency equal to the difference between the frequencies of the input signal and of the local oscillator means;

discriminator means operative to derive from the difference frequency signal an output signal which alternates between two logic states; and frequency control means responsive to the output signal of the discriminator means to control the frequency of the local oscillator means.

Again, preferably the local oscillator frequency is controlled in accordance with the difference frequency and depending on the logic state of the output signal.

BRIEF DESCRIPTION OF THE DRAWINGS

Other objects, features and advantages of the invention will become apparent from the following description, given by way of illustrative and non-limiting example, of embodiments of the invention illustrated in the accompanying drawings, in which.

Figure 1:
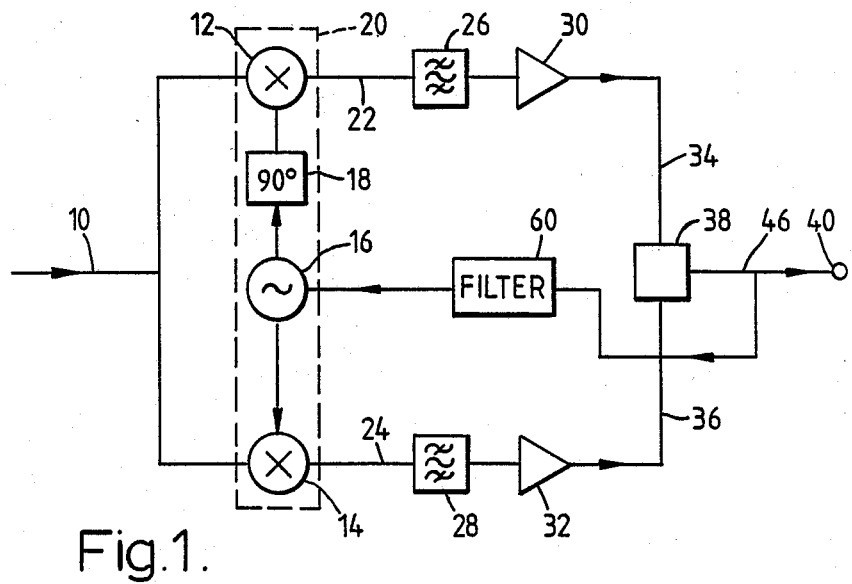
FIG. 1 is a block schematic diagram of an FM demodulator according to a first embodiment of the invention, and suitable for demodulating a balanced modulation signal.
Figure 2:
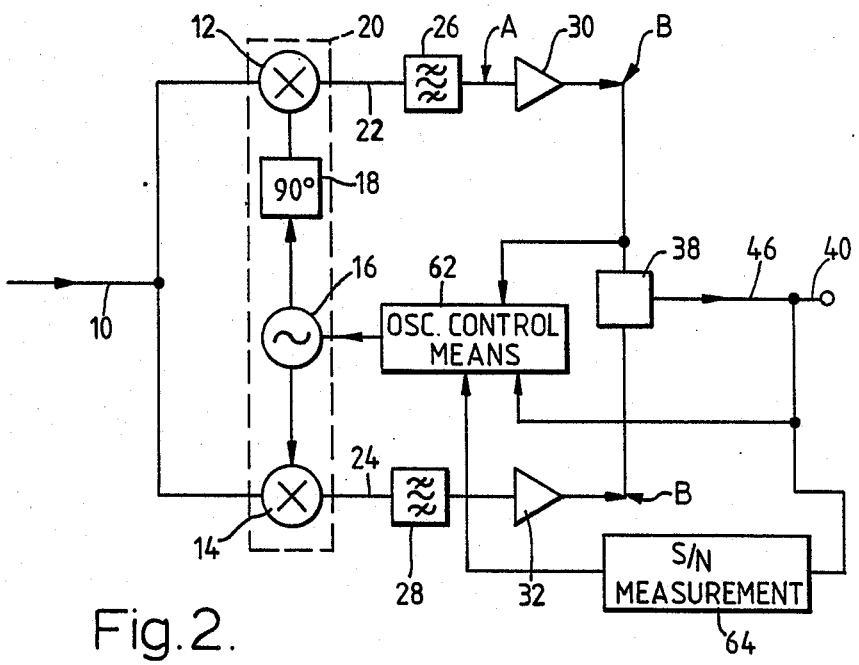
FIG. 2 is a block schematic diagram of an FM demodulator according to a second embodiment of the invention, and suitable for demodulating an unbalanced modulation signal.
Figure 7:
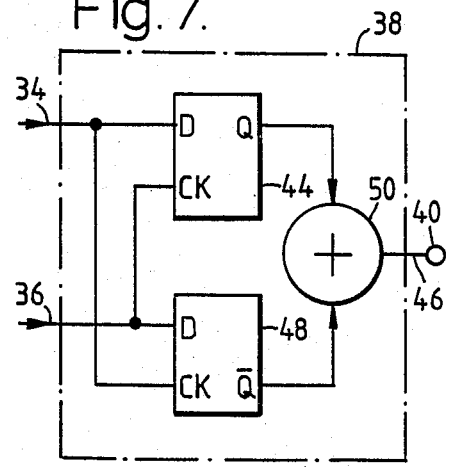
Figure 8:
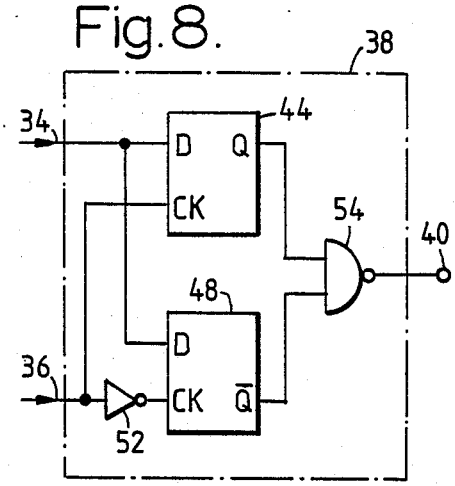
Figure 9:
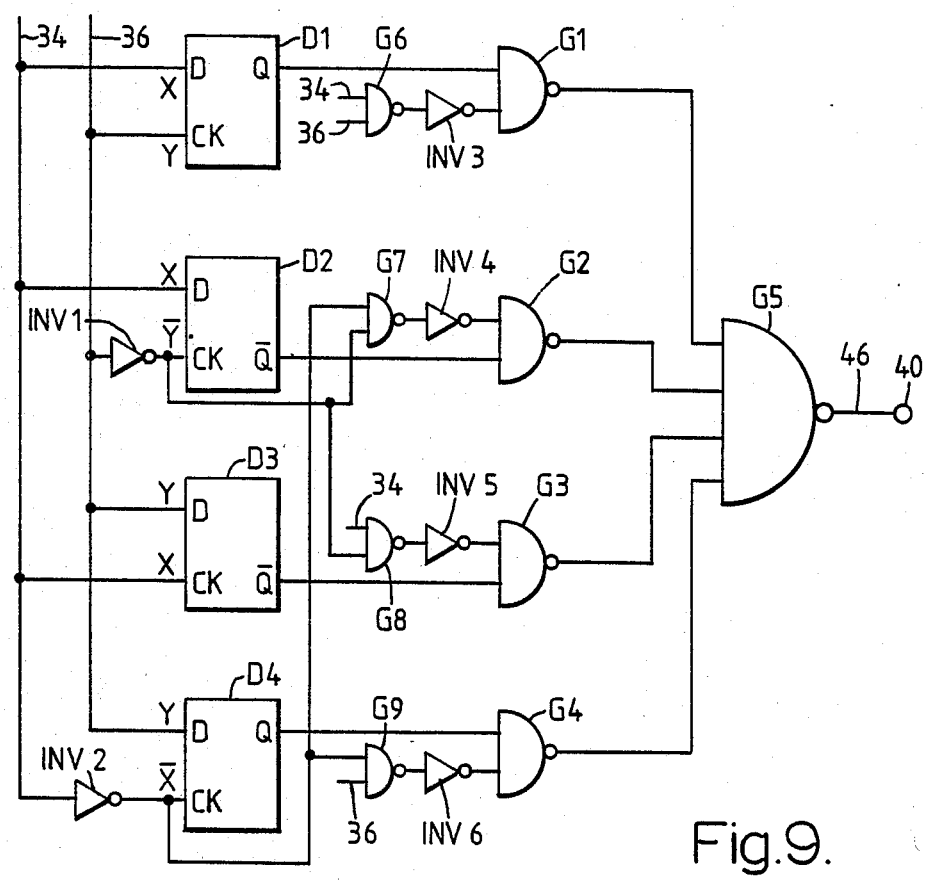
Figure 10:
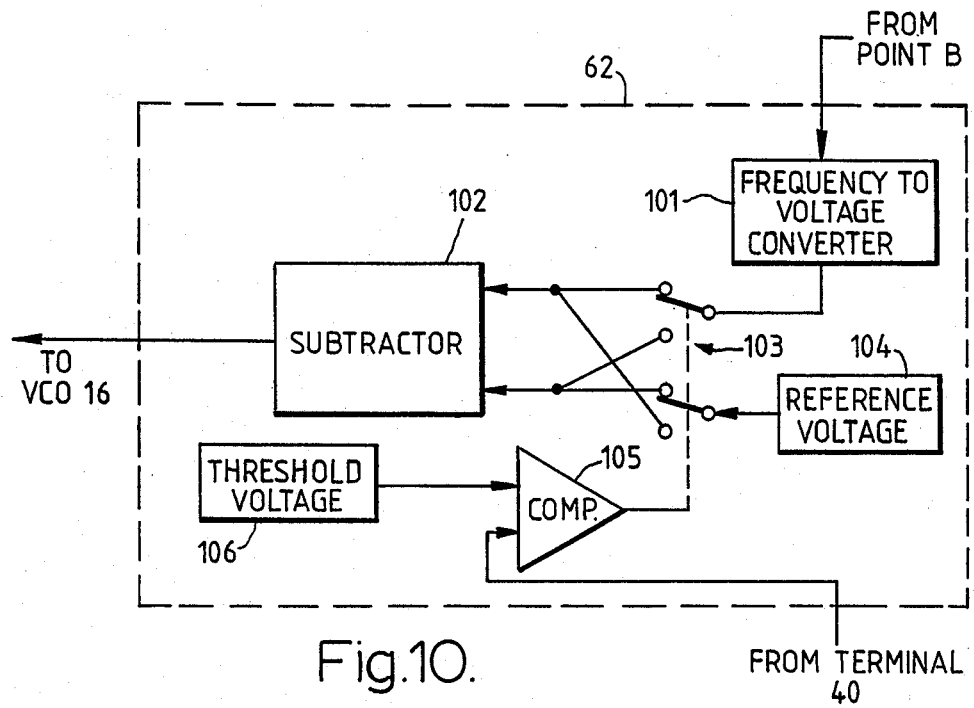
Figure 11:
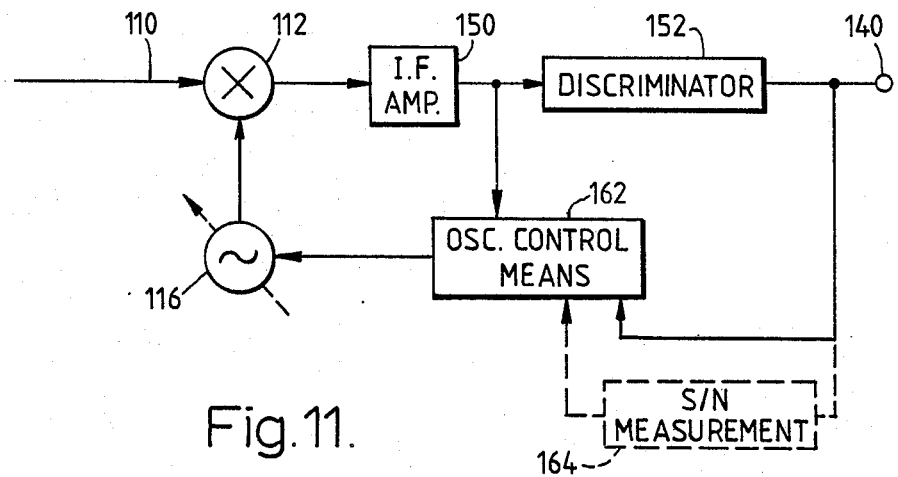

shows a frequency correction characteristic applied to the local oscillator of the demodulator of FIG. 2;

FIG. 7 is a block schematic diagram of another known form of sampling means for the demodulators of FIGS. 1 and 2;

FIG. 8 is a block schematic diagram of a further form of sampling means for use in the demodulators of FIGS. 1 and 2;

FIG. 9 is a block schematic diagram of a still further form of sampling means for use in the demodulators of FIGS. 1 and 2;

FIG. 10 is a block schematic diagram of one form of oscillator control means for use in the demodulators of FIG. 2; and FIG. 11 is a block schematic diagram of a further embodiment of the invention operating on the superheterodyne principle.

DESCRIPTION OF THE PREFERRED EMBODIMENTS

In the FM demodulator circuit shown in FIG. 1, that part of the circuit which is similar to the above-described known circuit will be considered first. An FM input signal on a line 10 is supplied to each of a pair of mixers or multipliers 12, 14 which, together with a local oscillator 16 and a phase shifter 18 which produces a phase shift at least approximately equal to 90°, constitute a frequency conversion means 20. The local oscillator 6 is connected directly to the mixer 14 and is connected to the mixer 12 via the phase shifter 18. The local oscillator 16 is intended to operate at a frequency at or near the average frequency of the FM input signal on the line 10. The frequency conversion means 20 is operative to produce on lines 22, 24, connected to the outputs of the multipliers 12, 14, a pair of signals of the same frequency but at least approximately in phase-quadrature relationship. Such two signals include components, at least approximately in phase-quadrature relationship, in the baseband range (i.e. the frequency range occupied by the signal or signals modulating the carrier of the FM input signal), and such components are filtered by filters 26, 28 which reject higher frequency components. The filters 26, 28 may as shown be bandpass filters, though low pass filters could be employed.

The filtered signals are amplified by high-gain amplitude limiters 30, 32 to produce square-wave signals with edges or amplitude transitions temporally located at positions at or near the positions where the signals emerging from the filters 26, 28 cross the mid-points of their peak-to-peak excursions. Such square-wave signals are, of course, like the signals from which they are derived, at least approximately in phase-quadrature relationship. One square-wave signal will either lead or lag the other depending upon whether the frequency of the FM input signal is greater or lesser than the frequency of the local oscillator 16. The square-wave signals from the limiters 30, 32 are shown in FIGS. 3(a) and 3(b), respectively, for the case in which the FM input signal has a frequency higher than that of the local oscillator 16, and are shown again in FIGS. 3(c) and 3(d), respectively, for the case where the FM input signal has a frequency lower than that of the local oscillator.

The square-wave output signals of the limiters 30, 32 are connected via lines 34, 36 to a sampling means 38. The sampling means 38 produces, on an output terminal 40 thereof, the output signal of the demodulator. The sampling means 38 is operative as explained below to periodically sample at least one of the square-wave output signals of the limiters 30, 32 at instants determined by (e.g. substantially coincident with) the positive going and negative-going edges or amplitude transitions of the other square-wave signal.

Figure 4:
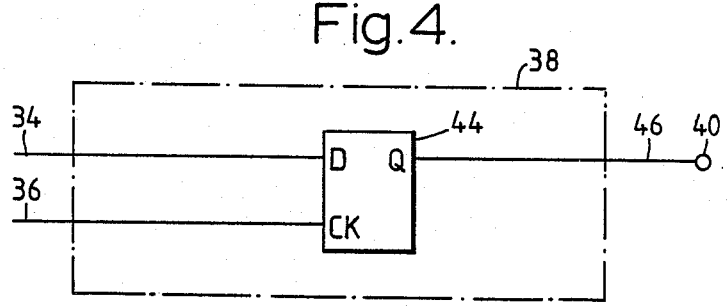
FIG. 4 is a block schematic diagram of one form of sampling means for the demodulators of FIGS. 1 and 2.

FIG. 4 shows as an example the sampling means 38 only of the above-mentioned version of the demodulator of FIG. 1 known from GB No. 1 517 121 in which the sampling means comprises a single D-type flip-flop 44 operative to sample the square-wave output signal of one only of the limiters 30, 32, namely the limiter 30, at instants corresponding only to the amplitude transitions in one sense (namely positive-going) of the other square-wave output signal. The 'D' and 'clock (CK)' inputs of the flip-flop 44 are connected to the line 34 and the line 36, respectively, and the output Q of the flip-flop is connected via a line 46 to the output terminal 40.

As explained above, FIGS. 3(a) and 3(b) represent the square-wave output signals of the limiters 30 and 32, present on the lines 34 and 36 respectively, for the case where the FM input signal frequency is higher than that of the local oscillator 16. Since the sampling means 38 of FIG. 4 is operative to sample the value of the square-wave signal from the limiter 30 (FIG. 3(a)) at the positive-going transitions of the square-wave signal (FIG. 3(b)) from the limiter 32, it can be seen from FIGS. 3(a) and 3(b) that the sampled signal (and therefore the output signal on the terminal 40) is always in one state ("low" level) while the FM input signal frequency is higher than that of the local oscillator 16.

Conversely, as will be apparent from the foregoing and from an inspection of FIGS. 3(c) and 3(d), the demodulator output signal on the terminal 40 will always be in the opposite state ("high" level) when the FM input signal frequency is below the frequency of the local oscillator 16. In short, the output signal on the terminal 40 will, in all of the above cases, be at one of two levels when the input FM signal frequency is above the local oscillator frequency and at the other of the two levels when the frequency of the FM input signal is below the local oscillator frequency.

It will be seen from the foregoing that, in order to obtain information from the sampling means 38, it is necessary that the frequency of the local oscillator 16 bear a certain relationship with the average frequency of the FM input signal. In general, the local oscillator frequency should be as close as possible to the average frequency of the FM input signal; the demodulator will function satisfactorily provided that the difference between these two frequencies does not exceed a predetermined value.

Figure 5:
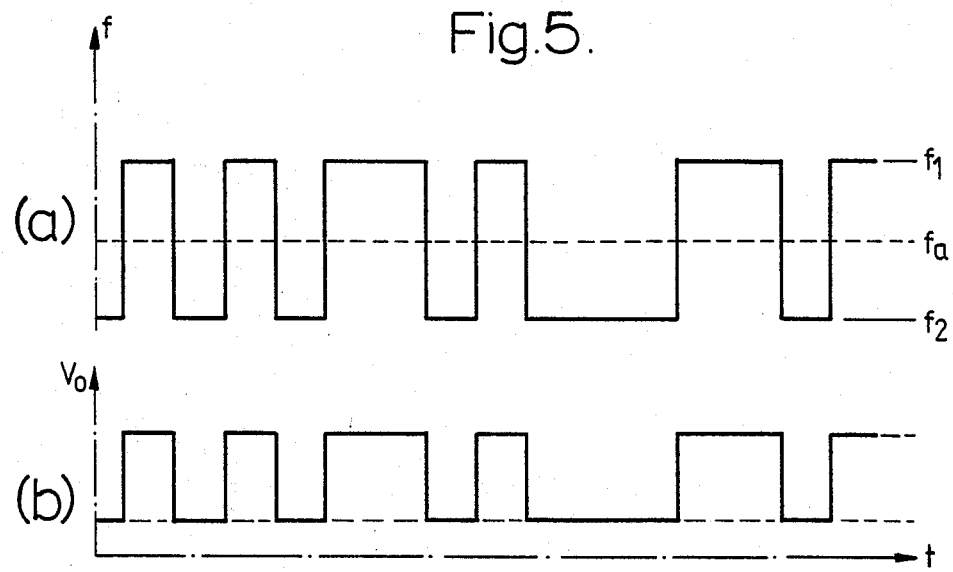
FIG. 5 is a graph depicting respective signals at curve (a) representing the variation with time of the frequency of a frequency-shift-keyed (FSK) FM input signal and at curve (b) a corresponding output signal (voltage $V_0$ varying with time t) when the signal of curve (a) is employed in the demodulators of the invention.

One form of FM signal particularly well suited to demodulation by the above-described demodulator is an FSK signal. Such signal may, for example, be a signal which is keyed to adopt one of two frequency values each corresponding to one of two binary data states. A typical such signal is represented in FIG. 5(a), (together with the resulting output voltage in FIG. 5(b)) which shows the variation in frequency (f) of the signal with time (t) between the two possible values ($f_1$ and $f_2$). The average frequency $f_a$ of the FSK FM input signal is defined as that frequency half-way between the frequencies $f_1$ and $f_2$. The deviation frequency is defined as the modulus of the difference between the average frequency $f_a$ and one of the frequencies $f_1$ and $f_2$.

In order to improve performance, embodiments of the invention provide automatic frequency control (AFC) of the local oscillator 16 in a sense to reduce the difference between the local oscillator frequency and the average frequency, more particularly to ensure that the local oscillator frequency is maintained half way between the peak deviation frequencies of the received FM signal.

Two different conditions arise:

(1) when the transmitted modulation is balanced, i.e. over any short period of say one or a few complete modulation cycles, the average modulation signal level is always the same; or (2) when the transmitted modulation is not balanced, i.e. over any short period of say one or a few complete modulation cycles the average modulation signal level varies. This situation arises when the signal is randomly modulated, FSK being the modulation technique.

When condition (1) is valid, and the modulation is sinusoidal in nature, the output on the terminal 40 can be used to provide AFC. Thus, as shown in FIG. 1, the output signal on the terminal 40 is averaged by a filter 60 and the resultant voltage is used to control the frequency of the oscillator 16, which is assumed to be a voltage-controlled oscillator (VCO). The design of the filter 60 is a function of the system parameters, e.g. data rate, acquisition rate, etc.

When condition (2) is valid, the AFC arrangement shown in FIG. 1 cannot be used because the control voltage for the VCO 16, i.e. the output voltage from the filter 60, will vary as a function of the modulation rather than as a function of the VCO frequency. Therefore, when condition (2) applies, use is made of an arrangement as shown in FIG. 2, in which an oscillator control means 62 and a signal to noise (S/N) measurement means 64 are connected as shown. In this case it is necessary for the oscillator control means 62 to initially determine the binary state at the output terminal 40.

The frequency of either input to the sampling means 38, i.e. the frequency at one of points B in FIG. 2, is measured by the control means 62. In an FSK system with short transition times, this frequency will be very close to the peak deviation.

The frequency of the VCO 16 can be corrected to lie half-way between the peak deviation frequencies of the received r.f. signal using the information obtained from the frequency at the point B and the binary state at the terminal 40, using Equation (1) below.

If the frequency difference between the actual frequency of the VCO 16 and the required frequency thereof is defined as E, then $$E = (f_B - f_D) \times S \quad (1),$$

where

S = 1 if the binary state of the terminal 40 represents a positive deviation from the nominal frequency, S = −1 if such binary state represents a negative deviation from the nominal frequency, $f_B$ = the frequency of the signal at the point B, and $f_D$ = the maximum deviation frequency.

The technique described with reference to FIG. 2 can be used in at least two systems:

(i) when it is required to optimise performance by correcting local oscillator offsets; and/or (ii) when the transmitter is not a true FSK transmitter, and the centre frequency of the transmitter will drift as a function of the modulation.

Figure 6A:
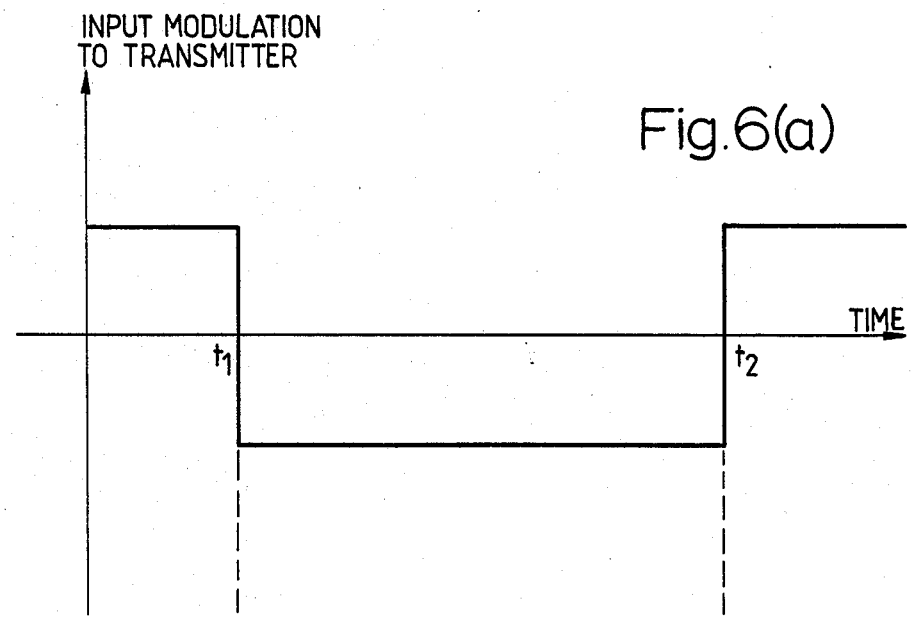
FIGS. 6(a) to 6(d) show frequency deviation characteristics for the demodulator of FIG. 2.
Figure 6B:
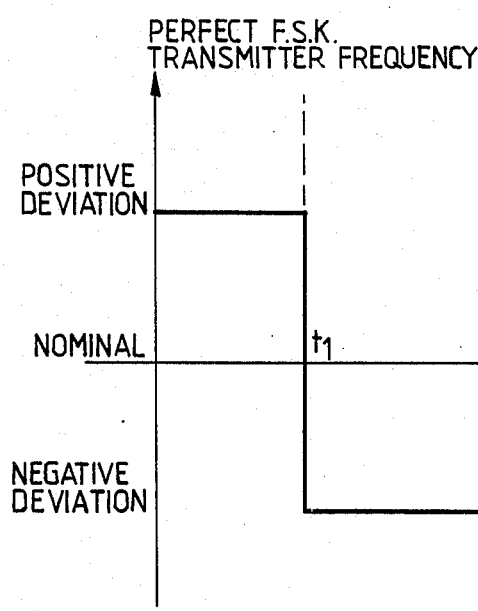
Figure 6C:
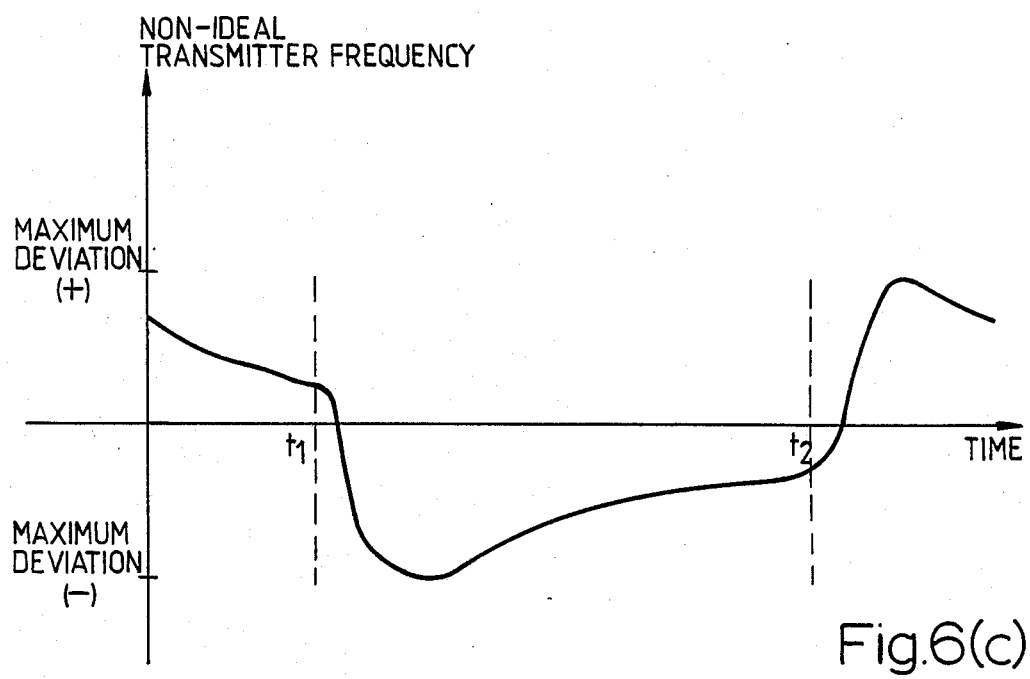
Figure 6D:
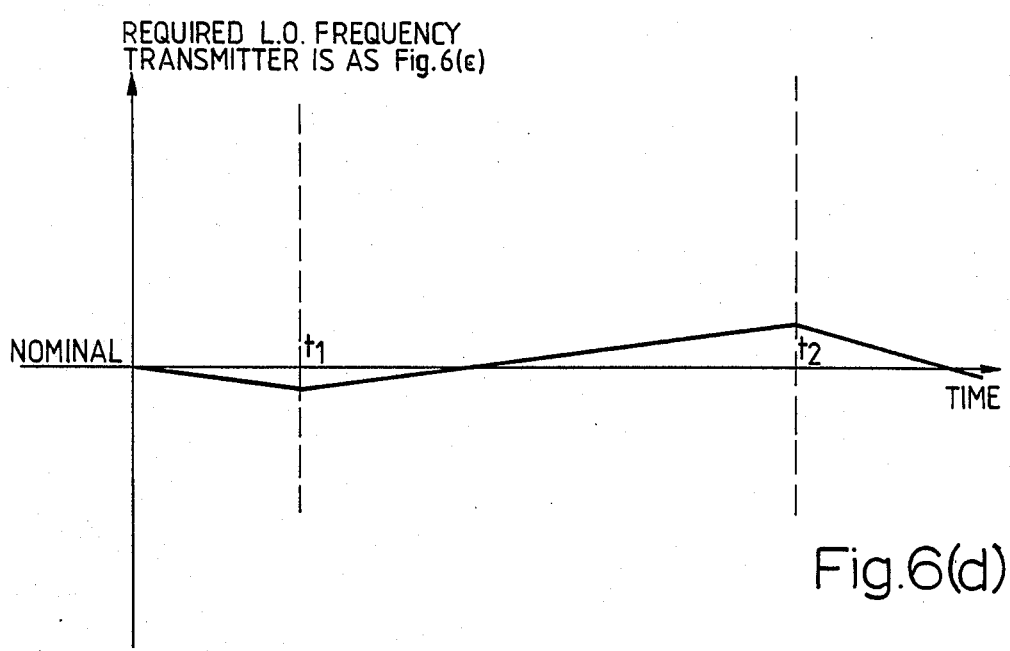
Figure 6E:
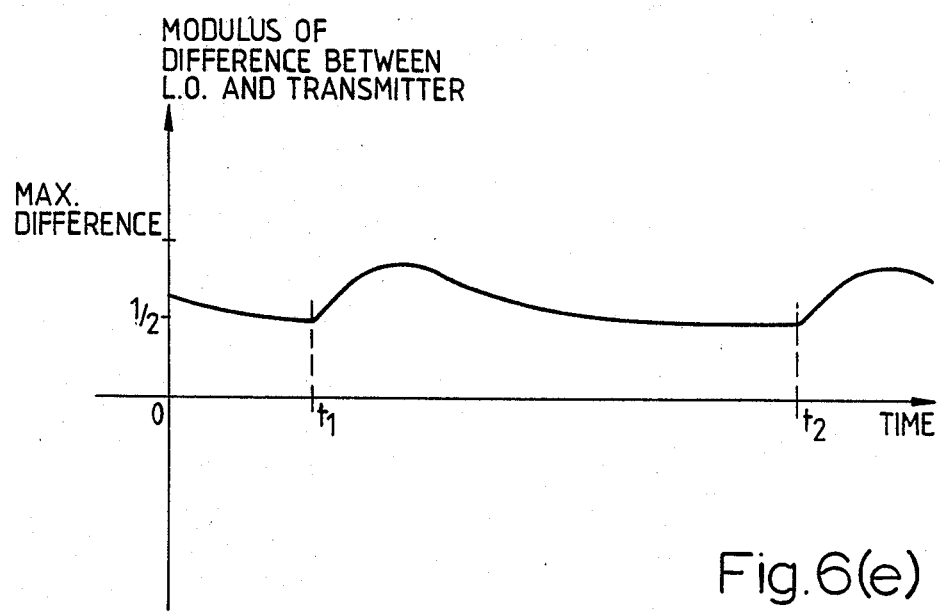
FIG. 6(e)

In situations such as described in (ii) above the instantaneous deviation frequency will not be constant and optimum performance of the receiver will only be achieved if the local oscillator can be controlled so that a minimum deviation is maintained. As an example, consider the situation depicted in FIGS. 6(a), 6(b), 6(c), and 6(d), which depict, respectively, the input modulation to the transmitter, the output frequency of an ideal FSK transmitter, the output frequency of an FM transmitter which has a limit on its high and low modulation frequency responses, and the local oscillator deviation which is required to maintain at least half the deviation difference frequency between the transmitter frequency and the local oscillator. Clearly, if the local oscillator 16 maintained the nominal centre frequency at points A and B in FIG. 2, namely the outputs of the filters 26, 28 and the outputs of the limiters 30, 32, the frequency difference between the local oscillator and the received signal would be low, at time $t_1$ and $t_2$ on FIG. 6(d). This would result in a low sensitivity since the filters 26, 28 are preferably bandpass filters, being optimised for the deviation frequency. Hence, to optimise performance, it is necessary for the local oscillator 16 to be corrected so that a minimum difference of, say, half the deviation frequency is maintained during the transmission, between the local oscillator and the transmitter frequencies. This can be seen in FIG. 6(e).

The AFC arrangements of FIGS. 1 and 2 can be used in many types of demodulator including the known demodulators referred to previously. Some suitable variations will now be described.

FIG. 7 shows a sampling means 38 which can be used in the FIGS. 1 and 2 embodiments, which sampling means is also known from GB No. 1 517 121. The sampling means comprises two D-type flip-flops 44, 48 so connected that each of these samples a respective one of the two square waves at instants corresponding to the positive-going amplitude transitions of the other. The Q and Q̄ outputs of the flip-flops 44, 48, respectively, are algebraically summed by summing means 50 connected to the output terminal 40. The net effect is as for the sampling means 38 of FIG. 4, except that the square waves are sampled twice as often (i.e. twice per period thereof) to improve error rate performance at low signal to noise ratios.

Figure 3:
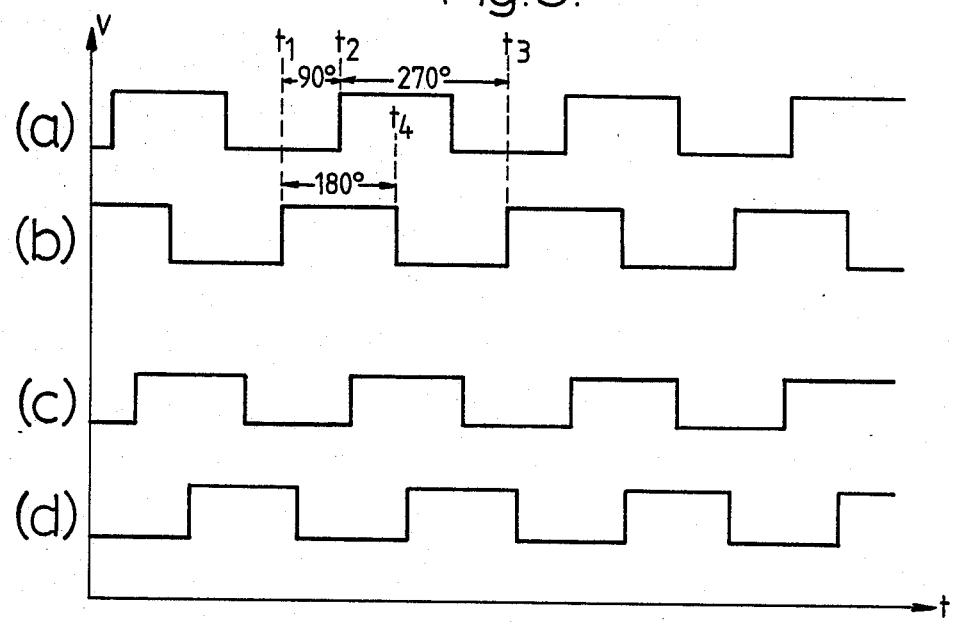
FIG. 3 is a graph depicting waveform diagrams representing voltage V against time t of square wave signals present at the outputs of respective amplitude limiters of the demodulators of FIGS. 1 and 2, with the curves (a) and (b) being for the case where an FM input signal to the particular demodulator has a frequency higher than that of a local oscillator of the demodulator, and curves (c) and (d) being for the case where the FM input signal has a frequency lower than that of the local oscillator.

As can be seen from FIG. 3, since the square waves are mutually staggered by 90°, so also are their positive-going transitions. Therefore, in one period of the square waves in the sampling means 38 of FIG. 7 one sample follows another after 90° (one quarter of the period), for example at the instants $t_1$ and $t_2$ shown in FIG. 3, and there is then a gap of 270° before and next sample ($t_3$). That is, the samples come in pairs spaced by 90° with a 270° interval between each pair.

FIG. 8 shows a modified form of sampling means 38 that can also be used in the circuits of FIGS. 1 and 2. Like the sampling means 38 of FIG. 7, that of FIG. 8 comprises two D-type flip-flops of which the flip-flop 44 is connected in the same way as in FIG. 7 so as to sample the square wave on the line 34 at the positive-going transitions of the square wave on the line 36. However, the flip-flop 48 is in this case connected to sample the signal on the same line (34) as the flip-flop 44, but, by virtue of an inverter 52, it does so at negative-going transitions of the square wave on the line 36. Thus, in this case, the samples follows one another at 180° intervals ($t_1$ and $t_4$ in FIG. 3), i.e. they are equally distributed over the period of the square waves whereby, relative to the arrangement of FIG. 7, noise remains uncorrelated. In the sampling means of FIG. 8, the Q and $\bar{Q}$ outputs of the flip-flops 44 and 48, respectively, are gated together by a gate 54.

FIG. 9 shows another form of the sampling means 38 that may also be used in the demodulators of FIGS. 1 and 2. In this case, both the square wave signals are sampled and sampling is effected at four 90° spaced instants during each period, i.e. at instants determined by both the positive-going and negative-going transitions of each of the two signals.

The sampling means 38 of FIG. 9 comprises four D-type flip-flops D1 to D4 having their D and CK inputs connected to the lines 34, 36 as shown. The flip-flops D1 and D2 are equivalent to the flip-flops 44 and 48 in FIG. 8 and are connected in the same manner. Inverters INV1 and INV2 invert the signals applied from the lines 36 and 34 to the CK inputs of the flip-flops D2 and D4. The inverter INV1 is equivalent to the inverter 52 in FIG. 8 and is connected in the same manner. The outputs Q of the flip-flops D1 and D4 and the complementary outputs $\bar{Q}$ of the flip-flops D2 and D3 are connected to inputs of respective 2-input NAND-gates G1, G4, G2 and G3, the outputs of which gates are connected to respective ones of the inputs of a 4-input NAND gate G5 whose output is connected to the output terminal 40 via the line 46. Further 2-input NAND gates G6 to G9 are connected via respective inverters INV3 to INV6 to the other inputs of the gates G1 to G4. The inputs of the gates G6 to G9 are connected, as shown, to the lines 34 and 36, either directly or via the inverters INV1 and INV2. The arrangement of the logic is such that the signals on both the lines 34 and 36 are sampled and such the each such signal is samples at both the negative-going and positive-going edges of the other signal. Further, of course, the arrangement is such that the output signal on the output terminal 40 is at one level when the FM input signal has a frequency higher than that of the frequency of the local oscillator 16 and at the other level when the FM input signal has a frequency lower than that of the local oscillator frequency.

It would be possible for a sampling means 38 to be of a construction of complexity intermediate FIGS. 8 and 9, for instance by omitting one of the D-type flip-flops of FIG. 9 and sampling only three times per period.

Further modifications to the FM demodulators described above with respect to FIGS. 1 and 2 can be made in the arrangement of their frequency conversion means. For example, such frequency conversion means may differ from the frequency conversion means 20 of the above-described demodulator in that the phase shifter 18 providing a phase shift of at least approximately 90° between the output signal of the local oscillator 16 and the multiplier 12 is removed; the phse-quadrature relationship of the output signals from the multipliers 12, 14 on the lines 22, 24 is preserved by disposing a phase-shifter, providing a phase shift of at least approximately 90°, in the path of the FM input signal before it arrives at the multiplier 12. Thus, in this case the phase shift of approximately 90° between the two signals is effected by phase shifting the FM input signal to one of the multipliers 12, 14 rather than the local oscillator signal fed to one of the multipliers.

Alternatively, the frequency conversion means 20 shown in FIGS. 1 and 2 could be modified by replacing the phase shifter 18 with two separate phase shifters disposed between the local oscillator 16 and respective ones of the mixers 12, 14 and having a total phase shift of 90°. Preferably, the respective phase shifts would be +45° and −45°. Such an arrangement would have the advantage over that of FIGS. 1 and 2 in that it would be easy to apply signals of equal level to the mixers 12, 14.

The function of the oscillator control means 62 shown in FIG. 2 is to implement the previously-stated Equation (1). In other words, the frequency $f_B$ of the signal at point B has deducted from it the maximum deviation frequency $f_D$ to derive the magnitude of the correction frequency to be implemented in the local oscillator 16. Whether the correction is to be positive or negative is determined by the output on the terminal 40, specifically depending on which binary state is present. One schematic implementation of the control means 62 is shown in FIG. 10. The frequency from point B is converted to a voltage in a frequency-to-voltage converter 101 and is then fed to one input of a subtractor 102 via a gating arrangement shown schematically as a changeover switch 103. A reference voltage 104 is fed to the other input of the subtractor 102 again via the changeover switch 103. The output of the subtractor 102 is connected to the control input of local oscillator 16. The changeover switch 103 is controlled by a comparator 105 which compares the voltage on terminal 40 with a threshold voltge 106 which is set intermediate the two voltages representing the binary states on terminal 40. Thus the polarity of the subtraction in subtractor 102 depends on the binary tate of terminal 40, in accordance with Equation (1). Also, the reference voltage 104 is representative of the maximum deviation frequency $f_D$.

Although not shown in FIG. 10, the signal to noise (S/N) measurement means 64 may advantageously be provided, as shown in FIG. 2, in order to prevent erroneous corrections being made under conditions of low signal to noise ratio. The S/N measurement means 64 can be arranged to count transitions per unit time and, if the counting period is made sufficiently long, will provide an effective measurement of the signal to noise ratio, which will be the more accurate the longer the time taken for the measurement. The transitions are detected about a suitable threshold level. The S/N measurement means 64 is then arranged to gate the control means 62 off whenever the S/N measurement is too low for accurate control. It may be found that such S/N measurement is unnecessary in which case the means 64 can be dispensed with.

The arrangements described above can be termed as '2-arm' or '2-channel' systems in that two signals in phase-quadrature relationship are developed and these signals are used to determine whether the FM input signal frequency is greater or less than that of the local oscillator signal, thereby providing an essentially binary output signal. Nonetheless, the principle is capable of extension to form a multi-arm or multi-channel system. In such a case, the number of multipliers, filters and limiters will be correspondingly greater than two and the frequency conversion means will be operative to derive a corresponding number of signals of mutually different phases. For example, in a '3-arm' modification of the demodulator of FIGS. 1 and 2, the local oscillator 16 could be connected directly to one multiplier and connected via respective phase shifters to the other two multipliers whereby the three multipliers will be fed with three like signals of mutually staggered (preferably equal staggered) phase.

The previously described arrangements have involved so-called direct conversion receivers. The invention is also applicable to superheterodyne receivers and one such embodiment is shown in FIG. 11 in which an FM input signal on a line 110 is supplied to a mixer 112 also supplied with an oscillating signal from a local oscillator 116, which together constitute a frequency conversion means. The resulting intermediate frequency (IF) signal is fed to an IF amplifier 150 and thence to a discriminator 152 which produces the required output at a terminal 140. Oscillator control means 162, similar to those of FIGS. 1 and 2, are similarly responsive to a frequency signal from IF amplifier 150 and the output binary state on terminal 140, to control the frequency of the local oscillator 116. The local oscillator 116 has its frequency adjusted to ensure that the received signal will lie on the passband of the IF filters. In a receiver having two or more superheterodyne stages at different frequencies, the output signal could be used to control any one of the local oscillators.

In order to ensure that no erroneous corrections are made, a signal to noise ratio measurement could also be used in order to gate the corrections, and this is shown in broken outline on FIG. 11 as block 164.

As a non-limiting example of how to control the local oscillator frequency, it is known that varying the voltage across a varacter diode can be used to alter the output frequency of an oscillator. This technique is in common use, and can be used to construct a suitable local oscillator. However, another common technique which is more suitable for logic controlled systems is to use diodes as switches which will bring into the circuit of interest a suitable component, usually a capacitor. These diodes can be switched by using binary level voltage. Several of these switches can be used so that sufficiently fine control can be exercised on the local oscillator.

If the local oscillator is not stable enough to remain sufficiently close to its nominal value, it might not be possible for sufficient signal to be passed through the filters in the receiver. In this case, it might be necessary for the local oscillator to be automatically switched over a range of frequencies in order to initially detect the input signal. Having detected this signal, the AFC system described in relation to FIG. 11 can be used.

Another control which could be used to align the frequency with the input signal is a temperature probe. This control can correct the local oscillator frequency control to a previously determined value by first determining the temperature of the local oscillator environment. After adjusting the local oscillator frequency with the temperature probe, the AFC technique described above can then be used to maintain the local oscillator frequency.

The FM demodulators described above employ fairly simple, non-linear circuitry and are eminently suited for embodiment in integrated circuit form, whereby they are particularly suited for use in compact items of equipment.

The demodulators described above can be used in a great variety of functions. They are, however, particularly suited to use in personal paging receivers. Thus, for example, such a demodulator could be used in a paging receiver to receive, for storage and/or display, data contained in an FSK FM input signal and/or to provide a visual or audible alert in response to receipt of an FM input signal modulated by a continuous tone or tones.

What is claimed is:

1. An FM demodulator comprising:

frequency conversion means, including local oscillator means, operative to derive from an FM input signal a plurality of like signals of mutually different phase;

filter means operative to filter each of said plurality of like signals to produce a corresponding plurality of filtered signals;

squaring means operative on each of the plurality of filtered signals to produce a corresponding plurality of substantially square-wave signals;

sampling means operative to sample periodically a said square-wave signal at instants determined by amplitude transitions of at least one other of said square-wave signals thereby to provide an output signal; and frequency control means responsive to the output signal of the sampling means to control the frequency of the local oscillator means, said frequency control means comprising means for deriving a difference signal indicative of the difference in frequency between one of said square-wave signals and a maximun deviation frequency of said demodulator, and means for deriving a polarity signal indicative of the logic state of said output signal, said difference signal providing the magnitude and said polarity signal providing the direction of change of a correction signal applied to the local oscillator means.

2. A demodulator according to claim 1, wherein the frequency control means comprises a frequency-to-voltage converter providing a voltage dependent on the frequency of said one square-wave signal, a reference voltage generator providing a reference voltage indicative of the maximum deviation frequency, and a subtractor means deriving the difference signal between the frequency-dependent and the reference voltages.

3. A demodulator according to claim 2, wherein the frequency control means includes means for changing the polarity of the difference signal provided by the subtractor means in accordance with the polarity signal indicative of the output signal logic state.

4. A demodulator according to claim 1, comprising a signal-to-noise measurement means arranged to inhibit control of the local oscillator means by the frequency control means in the presence of a signal-to-noise ratio in the output signal falling below a predetermined threshold.

5. An FM demodulator comprising:

frequency conversion means, including local oscillator means, operative to derive from an FM input signal a like signal at an intermediate frequency equal to the difference between the frequencies of the input signal and of the local oscillator means;

discriminator means operative to derive from the intermediate frequency signal an output signal which alternates between two signal states; and frequency control means responsive to the output signal of the discriminator means to control the frequency of the local oscillator means; said frequency control means comprising means for deriving a difference signal indicative of the difference in frequency between the intermediate frequency signal and a maximum deviation frequency of said demodulator, and means for deriving a polarity signal indicative of the logic state of said output signal, said difference signal providing the magnitude and said polarity signal providing the direction of change of a correction signal applied to the local oscillator means.

6. A demodulator according to claim 5, wherein the frequency control means comprises a frequency-to-voltage converter providing a voltage dependent on the frequency of said one intermediate signal, a reference voltage generator providing a reference voltage indicative of the maximum deviation frequency, and a subtractor means deriving the difference signal between the frequency-dependent and the reference voltages.

7. A demodulator according to claim 6, wherein the frequency control means includes means for changing the polarity of the difference signal provided by the subtractor means in accordance with the polarity signal indicative of the output signal logic state.

8. A demodulator according to claim 5, comprising a signal-to-noise measurement means arranged to inhibit control of the local oscillator means by the frequency control means in the presence of a signal-to-noise ratio in the output signal falling below a predetermined threshold.

* * * * *